United States Patent
Sakata

(10) Patent No.: US 7,046,620 B2
(45) Date of Patent: May 16, 2006

(54) METHOD AND NETWORK FOR TOLERATING A FAULT ON HUBS AND LINES

(75) Inventor: Masayuki Sakata, Tokyo (JP)

(73) Assignee: NEC Corporation, Tokyo (JP)

( * ) Notice: Subject to any disclaimer, the term of this patent is extended or adjusted under 35 U.S.C. 154(b) by 829 days.

(21) Appl. No.: 09/874,219

(22) Filed: Jun. 6, 2001

(65) Prior Publication Data

US 2002/0001286 A1    Jan. 3, 2002

(30) Foreign Application Priority Data

Jun. 7, 2000    (JP) .............................. 2000-169930

(51) Int. Cl.
  *H04J 1/16* (2006.01)
(52) U.S. Cl. .................. 370/217; 370/242; 370/254
(58) Field of Classification Search ................ 370/227, 370/228, 230, 231, 234, 218
  See application file for complete search history.

(56) References Cited

U.S. PATENT DOCUMENTS

| | | | |
|---|---|---|---|
| 5,930,249 A * | 7/1999 | Stademann et al. | 370/351 |
| 5,999,286 A * | 12/1999 | Venkatesan | 398/5 |
| 6,176,710 B1 * | 1/2001 | Ewing et al. | 439/76.1 |
| 6,308,282 B1 * | 10/2001 | Huang et al. | 714/4 |
| 6,392,990 B1 * | 5/2002 | Tosey et al. | 370/218 |
| 6,594,231 B1 * | 7/2003 | Byham et al. | 370/223 |
| 6,693,901 B1 * | 2/2004 | Byers et al. | 370/362 |

FOREIGN PATENT DOCUMENTS

| | | |
|---|---|---|
| JP | 63-174431 A | 7/1988 |
| JP | 5-53957 A | 3/1993 |
| JP | 6-110800 A | 4/1994 |
| JP | 7-38595 A | 2/1995 |
| JP | 7-74771 | 3/1995 |
| JP | 7-234849 | 9/1995 |
| JP | 7-235933 A | 9/1995 |
| JP | 10-11369 A | 1/1998 |
| JP | 10-224382 A | 8/1998 |
| JP | 2973373 | 9/1999 |
| JP | 11-275129 A | 10/1999 |
| JP | 11-355868 A | 12/1999 |

OTHER PUBLICATIONS

H. Kamada et al., Optical LAN applications and prospects, *Gazo Denshi Gakkaishi*, Japan, Institute of Image Electronics Engineers, vol. 23, No. 4, (Aug. 25, 1994), pp. 350-363.
BayStack 410 and 450 Switches, Nortel Networks, Aug. 1999, pp. 20-30.

* cited by examiner

*Primary Examiner*—Brian Nguyen
*Assistant Examiner*—Tri H. Phan
(74) *Attorney, Agent, or Firm*—Sughrue Mion, PLLC

(57) ABSTRACT

Hubs 11–14 are circularly connected with each other. The hubs 11 and 12 are supplied with electric power from the power source 1 and the hubs 13 and 14 are supplied with electric power from the power source 2. Each of the terminals 7–10 has two ports each of which is connected to the hub supplied from different power source.

15 Claims, 3 Drawing Sheets

METHOD AND NETWORK FOR TOLERATING A FAULT ON HUBS AND LINES

BACKGROUND OF THE INVENTION

This invention relates to a network that has a plurality of hubs connected by lines and a method for use in reducing a fault in such a network.

Spanning tree routing, which is ruled in IEEE 802.1d, is used for backup of lines in a LAN. According to the routing, a line that is currently establishing a connection is switched to another line that is reserved.

Conventionally, the spanning tree routing is applied to connections between hubs in a LAN in which each one of hubs is connected with two other hubs. In this LAN, the connections between hubs are strong against faults. However, in this LAN, a hub and a terminal are connected through a single line and therefore, the connections between hubs and terminals are weak against faults.

In another conventional LAN, as shown in FIG. 1, the spanning tree routing is applied to connections between hubs and terminals. In this LAN, hubs 3, 4, 5 and 6 are sequentially connected via a single line. The hubs 3 and 4 are connected via a line 101. The hubs 4 and 5 are connected via a line 102. The hubs 5 and 6 are connected via a line 103. Each of terminals 7, 8, 9 and 10 has two LAN ports each of that is connected to different hub from each other. The terminals 7 and 8 are connected to the hub 3 via lines 111 and 113, and are connected to the hub 5 via lines 112 and 114, respectively. The terminals 9 and 10 are connected to the hub 4 via lines 115 and 117, and are connected to the hub 6 via lines 116 and 118, respectively. The terminals 7, 8, 9 and 10 are operable for the spanning tree routing.

Doubled lines establish connections between hubs and terminals in the LAN, and therefore, the connections are strong against faults. However, in this LAN, connections between hubs are not doubled and consequently are weak against faults. Further, even if the terminals have a function for the spanning tree routing, a fault on the hub might not be detected.

Turning again to FIG. 1, for example, it is assumed that: a fault occurs on the hub 4; and current lines of the terminals 7, 8, 9 and 10 are the lines 111, 113, 115 and 117, respectively. In this case, the terminals 9 and 10 switch the lines 115 and 117 to 116 and 118, respectively. On the other hand, the terminals 7 and 8 keep the lines 111 and 112 because the hubs 3 and 5 are normally working. Consequently, the terminals 7 and 8 can not communicate to the terminals 9 and 10.

The problem can be solved by an upper application program that works on the terminal to constantly confirm connections from the terminal through the other terminals and to switch from the current line to the reserve line when a fault occurs on the LAN. However, the upper application constantly sends packets for confirming connections and, as a result, the packets always occupy all of the connections, and it may take long time to switch from the current line to the reserve line.

Furthermore, in the conventional LAN shown in FIG. 1, each power source of the hubs has to be doubled in order to make the LAN strong against faults on power source.

SUMMARY OF THE INVENTION

It is an object of this invention to provide a method of connecting hubs and terminals of a network and a network thereof that can be strong against a fault on either one of the hubs, lines between the hubs or lines between the hub and the terminal.

It is another object of this invention to provide such method and network that does not require an upper application for constantly confirming connections.

It is still another object of this invention to provide such method and network that can immediately switch active line.

It is still another object of this invention to provide such method and network that can tolerate breakdown of power source supplying power to the hubs.

According to the present invention, a method of connecting a plurality of hubs and a plurality of terminals with lines, wherein each of the terminals comprises a plurality of ports each of that is connected to one of the lines is provided. The method comprises the steps of: connecting one of the ports and one of the hubs with one of the line at each of the terminals; connecting another port of the same terminal with another of the hubs at each of the terminals; activating one of the lines connected with each of the terminals; circularly connecting the hubs with each other; and inactivating one of lines between adjoining two hubs.

The method may further comprise the step of detecting a fault on the port connected with the line that was activated at the activating step; inactivating the port; and activating another one of the ports of the same terminal. In this case, The method may further comprise the step of informing the other terminals that the terminal one of whose ports is detected the fault inactivates the port connected with the line that was activated at the activating step and activates another one of the ports of the same terminal.

Preferably, the hubs are stackable hubs.

The method may further comprise the steps of partitioning the hubs into a plurality of groups each of which includes at least one of the hubs; and supplying power to each of the groups from different power source. In this case, The hub which is connected at the former connecting step and the hub which is connected at the later connecting step may belong to different one of the groups from each other.

According to the present invention, a network comprising a plurality of hubs and a plurality of terminals is further provided. In the network, each of the terminals comprises a plurality of ports each of which is connected to different one of the hubs via a line. One of the lines connected to one of the terminals is active and the rest of the lines connected to the same terminal is inactive. The hubs are circularly connected with each other. And one of lines between adjoining two of the hubs is inactive.

Each of the terminals may comprise: a unit for detecting a fault on the port connected to the active line; a unit for inactivating the active line; and a unit for activating one of the inactive lines. In this case, each of the terminals may further comprise a unit for informing the other terminals of inactivating the active line and activating one of the inactive lines.

Preferably, the hubs are stackable hubs. In this case, the top hub is connected with the bottom hub to circularly connect the hubs with each other.

The hubs may be partitioned into a plurality of groups each of which includes at least one of the hubs; and each of the groups is supplied power from different power sources. In this case, at each of the terminals, at least one of the ports may be connected to the hub that is partitioned into different group from the rest of the ports.

DESCRIPTION OF THE PREFERRED EMBODIMENTS

Figure 1:
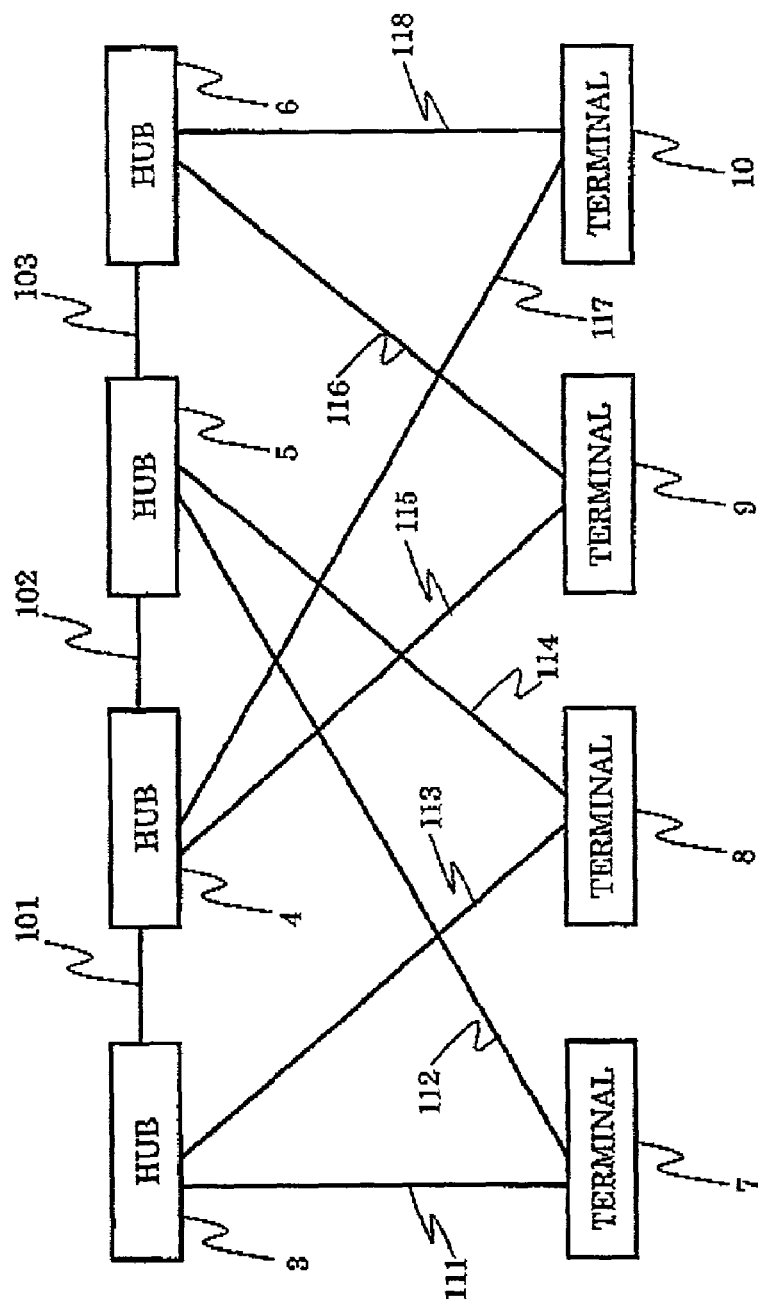
FIG. 1 is a block diagram for describing a conventional LAN in which connections between hubs and terminals are duplex.
Figure 2:
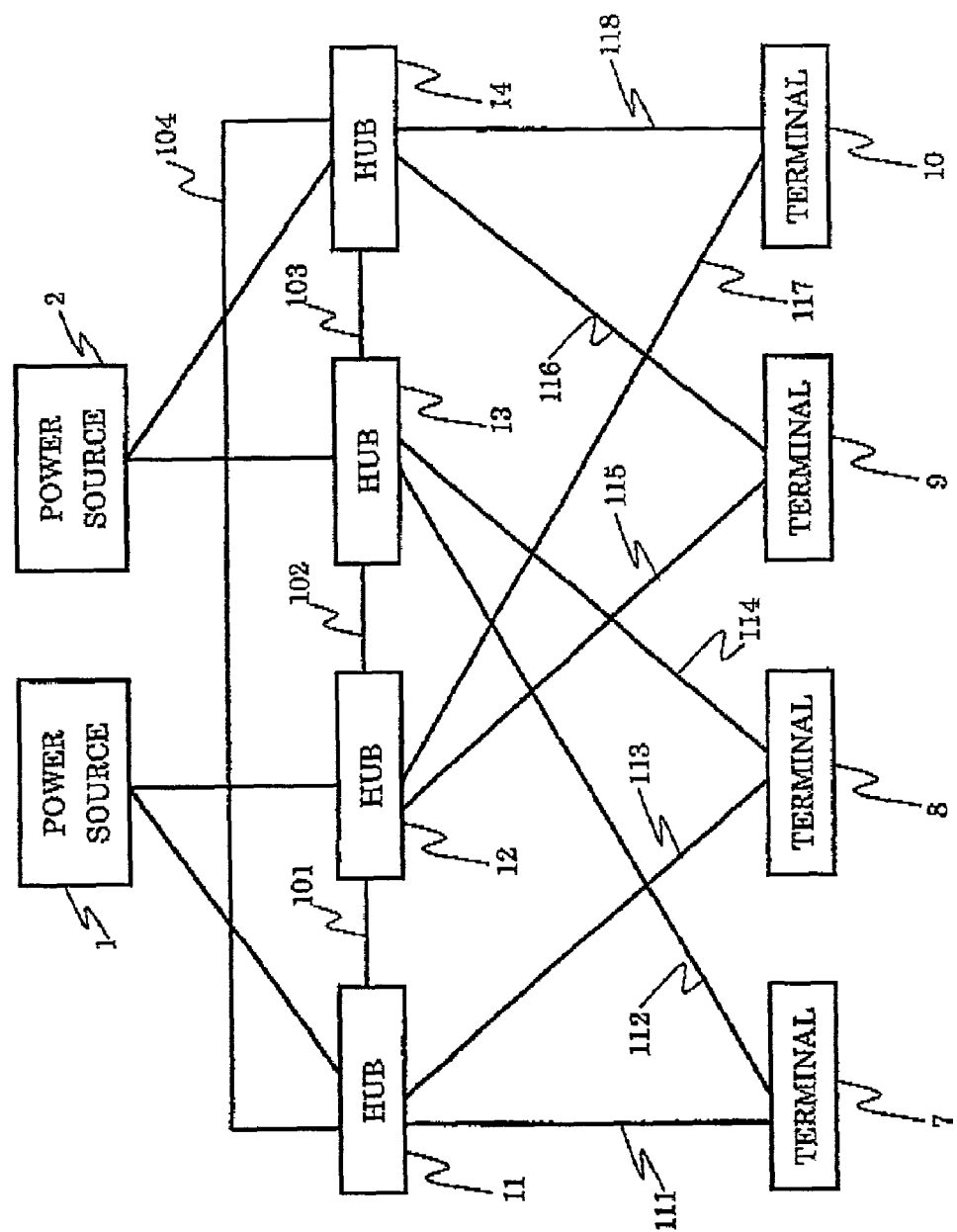
FIG. 2 is a block diagram for describing a LAN of the present invention.

Description will be made about an embodiment of the present invention. As shown in FIG. 2, the embodiment is a LAN including power sources 1, 2, hubs 11, 12, 13, 14, terminals 7, 8, 9 and 10.

The hubs 11, 12, 13 and 14 are stackable hubs and are circularly connected with each other. Namely, the hubs 11, 12, 13 and 14 are stacked and connected with each other via lines 101, 102 and 103, and further, the hub 11 is connected to the hub 14 via a line 104.

The hubs 11, 12, 13 and 14 are partitioned into two groups that are supplied power from different power source. The hubs 11 and 12 are supplied from the power source 1. The hubs 13 and 14 are supplied from the power source 2. The power sources 1 and 2 are independent form each other.

Each of the terminals 7, 8, 9 and 10 has two LAN ports, first port and second port. The first port is connected to one of the hubs 11, 12, 13 and 14, and the second port is connected to another one of the hubs 11, 12, 13 and 14. It is noted that the hub connected to the first port and the hub connected to the second port are supplied with power from different power sources from each other. For example, the terminals 7 and 8 are connected to the hub 11, which is supplied from the power source 1, and the hub 13, which is supplied from the power source 2.

Figure 3:
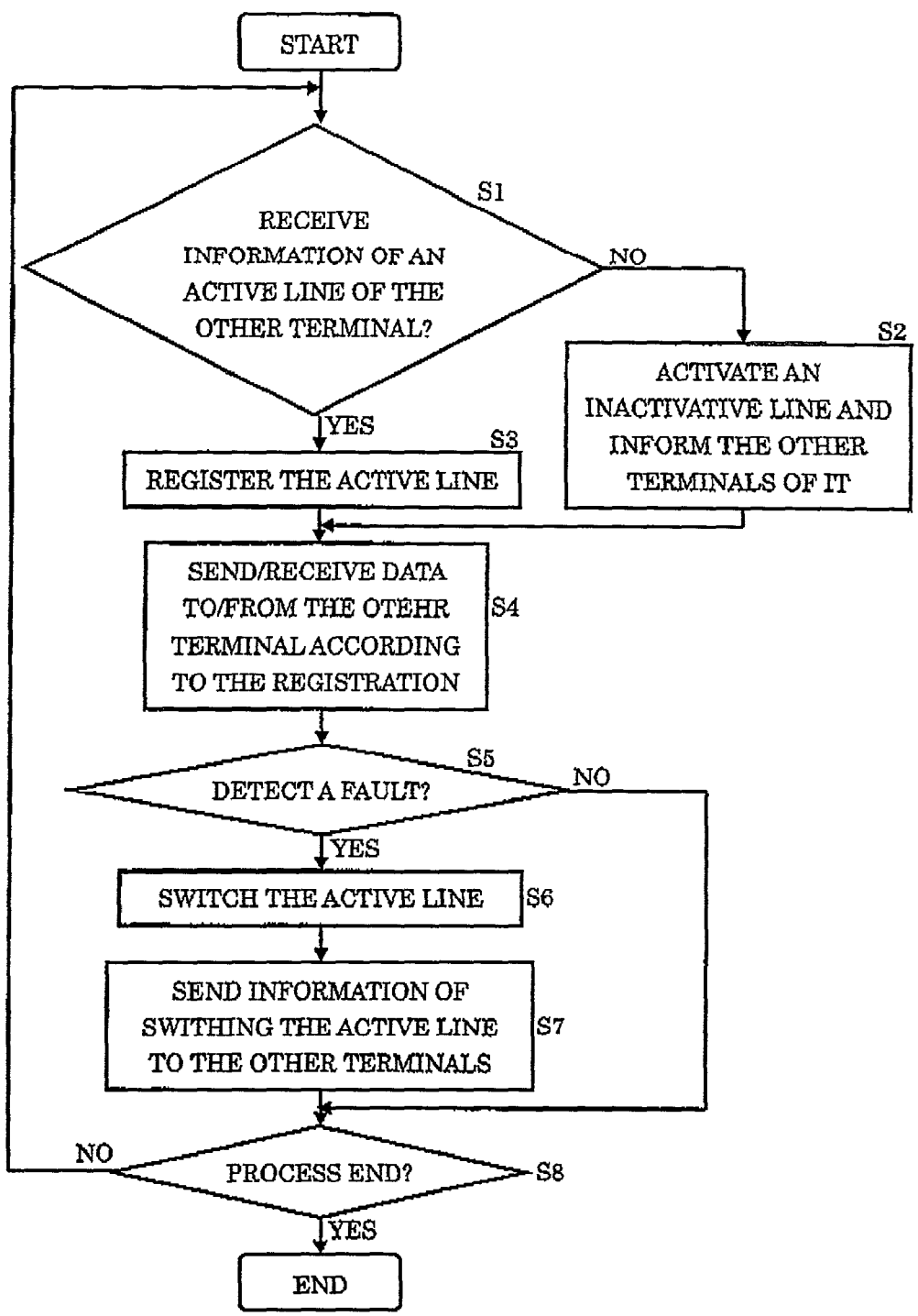
FIG. 3 is a flowchart for describing operation of the LAN shown in FIG. 2.

With reference to FIG. 3, switching operation of the terminals 7, 8, 9 and 10 is described below.

Each of the terminals 7, 8, 9 and 10 is connected to two lines. One of the lines is activated and the other is inactivated according to a previously registered registration or list. The terminals 7, 8, 9 and 10 send information through an active one of the lines to the other terminals (STEP S1, S2).

This information may be sent according to either an exclusive protocol for sending it or ARP (address resolution protocol). For example, first, the terminal 7 sends a MAC (media access control) address and an IP (internet protocol) address as this information on ARP to the terminals 8, 9 and 10. Then, the terminals 8, 9 and 10 register the MAC and IP address of the terminal 7 when the terminals 8, 9 and 10 respond to the information. After that, the terminal 7 registers MAC and IP addresses of the terminals 8, 9 and 10 (STEP S1, S3).

It is assumed that active lines are lines 111, 113, 115 and 117. In this case, two routes are available for sending data from the terminal 7 to the terminal 9. One route includes the line 111, the hub 11, the line 101 and the hub 12. The other route includes the line 111, the hub 11, the line 104, the hub 14, the line 103 and the hub 13. One of the routes is selected according to function of stackable hubs of the hubs 11, 12, 13 and 14. Now, it is assumed that the former route. A route for sending data from the terminal 9 to 7 and other routes between two of the terminals 7, 8, 9 and 10 are similarly decided.

Next, description will be made about switching operation between an active line and an inactive line. If a fault occurs at the hub 11 and the hub 11 becomes unavailable, the terminal 7 finds that the line 111 is unavailable. Next, the terminal 7 inactivates the line 111 and activates the line 113. Then, the terminal 7 informs the terminals 8, 9 and 10 of switching active line (STEP S5, S6 and S7).

In order to send information about switching current active line, either an exclusive protocol for sending the information or ARP may be applicable. Similarly, the terminal 8 switches its active line from the line 113 to 114.

The hubs 12, 13 and 14 can communicate via the lines 102 and 103 with each other. Consequently, the terminal 7 can send data to the terminal 9 via the line 112, the hub 13, the line 102, the hub 12 and the line 115. Similarly, data can be sent from the terminal 9 to 7 and between other combinations of two of the terminals 7, 8, 9 and 10.

In the description mentioned above, a fault occurs at the hub 11. However, this description is applicable to the case that the line 111 becomes unavailable because the wire of the line broke or was pulled out.

Next, it is assumed that the power source 1 stops supplying power to the hubs 11 and 12. In this case, the terminals 7, 8, 9 and 10 switch to the lines 112, 114, 116 and 118 in order to keep connections via the hubs 5 and 6.

As mentioned above, each of the terminals 7, 8, 9 and 10 is connected to two of the hubs 11, 12, 13 and 14. As a result, even if a fault occurs at any one of the hubs 11, 12, 13 and 14, or even if one of the lines 111-118 becomes unavailable, the terminals 7, 8, 9 and 10 can keep communicating between each other.

Furthermore, the hubs 11, 12, 13 and 14 are supplied from two power sources 1 and 2 with the electric power, as mentioned before. As a result, even if one of the power sources 1 and 2 breaks down, the terminals 7, 8, 9 and 10 can keep communicating with each other. Each of the hubs 11, 12, 13 and 14 does not have to be supplied from duplex power source.

While this invention has thus far been described in conjunction with an embodiment thereof, it will be readily possible for those skilled in the art to put the this invention into various other manners.

What is claimed is:

1. A method of connecting a plurality of hubs and a plurality of terminals with lines, each of the terminals comprising a plurality of ports each of which is connected to one of the lines, comprising:

connecting a first port and a first hub of the hubs with one of the lines at each of the terminals;

connecting a second port of the same terminal with a second hub of the hubs at each of the terminals;

activating one of the lines connected with each of the terminals;

circularly connecting the hubs with each other; and inactivating one of lines between adjoining two hubs, wherein the hubs are physically connected only with each other forming a circular cluster and wherein the hubs are logical connected only with each other forming a linear configuration.

2. The method claimed in clam 1, further comprising:

detecting a fault on the first port of a terminal connected with the activated line;

inactivating the first port; and activating the second port of the same terminal.

3. The method claimed in claim 2, further comprising informing other terminals that the terminal inactivated the first port of the terminal and activated the second port of the same terminal.

4. The method claimed in claim 1, wherein the hubs are stackable hubs.

5. The method claimed in claim 1, further comprising:
partitioning the hubs into a plurality of groups, each of which comprises at least one of the hubs; and
supplying power to each of the groups from a different power source.

6. The method claimed in claim 5, wherein the hub which is connected to the first port of the terminal and the hub which is connected to the second port of the same terminal belong to different one of the groups from each other.

7. The method claimed in clam 1, wherein the inactivating one of lines between adjoining two hubs forms a cascade connection of the plurality of hubs and wherein the cascade connection logically forms a single hub composed of the plurality of hubs.

8. The method according to claim 7, wherein the plurality of hubs is configured for unicast and broadcast communications.

9. The method according to claim 1, wherein when the plurality of hubs detect that one of the activated lines is unavailable, the plurality of hubs activate the inactive line.

10. A network comprising a plurality of hubs and a plurality of terminals, wherein:
each of the terminals comprises a plurality of ports each of which is connected to different one of the hubs via a line;
one of the lines connected to one of the terminals is active and the rest of the lines connected to the same terminal is inactive;
the hubs are circularly connected with each other; and
one of lines between adjoining two of the hubs is inactive,
wherein the hubs are physically connected only with each other forming a circular cluster and wherein the hubs are logical connected only with each other forming a linear configuration.

11. The network claimed in claim 10, each of the terminals comprising:
means for detecting a fault on the port connected to the active line;
means for inactivating the active line; and
means for activating one of the inactive lines that connects one of the terminals to one of the hubs.

12. The network claimed in claim 11, each of the terminals further comprising means for informing the other terminals of inactivating the active line and activating one of the inactive lines.

13. The network claimed in claim 10, wherein the hubs are stackable hubs, and the top hub is connected with the bottom hub to circularly connect the hubs with each other.

14. The network claimed in claim 10, wherein:
the hubs are partitioned into a plurality of groups each of which comprises at least one of the hubs; and
each of the groups is supplied with power from different power sources.

15. The network claimed in claim 14, wherein at each of the terminals, at least one of the ports is connected to the hub that is partitioned into different group from the rest of the ports.

* * * * *